US009429120B2

(12) United States Patent
Kifer et al.

(10) Patent No.: US 9,429,120 B2
(45) Date of Patent: Aug. 30, 2016

(54) DETECTING LEAKS IN A FEEDTHROUGH DEVICE

(71) Applicant: WOODWARD, INC., Fort Collins, CO (US)

(72) Inventors: Roger M. Kifer, Fort Collins, CO (US); Steven A. DeHerrera, Fort Collins, CO (US); Gregory J. Brodsack, Loveland, CO (US); Timothy J. Farrow, Fort Collins, CO (US)

(73) Assignee: Woodward, Inc., Fort Collins, CO (US)

(*) Notice: Subject to any disclaimer, the term of this patent is extended or adjusted under 35 U.S.C. 154(b) by 342 days.

(21) Appl. No.: 13/663,020

(22) Filed: Oct. 29, 2012

(65) Prior Publication Data

US 2014/0117118 A1 May 1, 2014

(51) Int. Cl.
*G01M 15/00* (2006.01)
*F02M 51/00* (2006.01)
*F02M 55/00* (2006.01)

(52) U.S. Cl.
CPC .......... *F02M 51/005* (2013.01); *F02M 55/002* (2013.01); *F02M 2200/16* (2013.01)

(58) Field of Classification Search
CPC . F02M 51/005; F02M 55/002; F02M 55/025; F02D 41/22
USPC ............ 73/40, 49.7, 114.45, 114.48, 114.51; 123/468–471, 490, 685
See application file for complete search history.

(56) References Cited

U.S. PATENT DOCUMENTS 4,416,156 A 11/1983 Demark et al.
4,450,409 A 5/1984 Castleman et al.
4,804,330 A 2/1989 Makowski et al.
4,858,466 A * 8/1989 Takahashi ............ F02M 65/002 73/114.48
5,022,865 A * 6/1991 Wright et al. ................ 439/279
6,349,025 B1 2/2002 Fraley et al.
6,566,978 B2 5/2003 Stevenson et al.
7,281,305 B1 * 10/2007 Iyer et al. .................... 29/25.42
7,692,553 B2 4/2010 Kubala
7,695,331 B2 * 4/2010 Kerner ......................... 439/877
2002/0073970 A1 * 6/2002 Lorraine ...................... 123/470
2008/0202590 A1 8/2008 Farrow et al.

(Continued)

FOREIGN PATENT DOCUMENTS

EP 2589788 5/2013
KR 100896967 5/2009

(Continued)

OTHER PUBLICATIONS

Authorized Officer Sophie Gondiant, PCT International Search Report and Written Opinion of the International Searching Authority, International Application No. PCT/US2013/065922, Feb. 6, 2014, 9 pages.

(Continued)

*Primary Examiner* — Craig Schneider
*Assistant Examiner* — Angelisa L Hicks
(74) *Attorney, Agent, or Firm* — Fish & Richardson P.C.

(57) ABSTRACT

A feedthrough device includes first and second opposing outer end faces. The feedthrough device includes an opening, between the first and second opposing outer end faces, that allows fluid communication between an interior and an exterior of the feedthrough device. A conductor extends through the feedthrough device from the first end face, through the interior, to the second end face.

22 Claims, 2 Drawing Sheets

(56) References Cited

U.S. PATENT DOCUMENTS

| | | | | |
|---|---|---|---|---|
| 2008/0315008 | A1 | 12/2008 | Coldren et al. | |
| 2009/0309053 | A1 | 12/2009 | Farrow et al. | |
| 2010/0050991 | A1* | 3/2010 | Cooke | 123/470 |
| 2010/0154891 | A1* | 6/2010 | Evans et al. | 137/2 |
| 2010/0294242 | A1* | 11/2010 | Kondo et al. | 123/470 |
| 2010/0307818 | A1 | 12/2010 | Sturges et al. | |

FOREIGN PATENT DOCUMENTS

| | | |
|---|---|---|
| WO | WO2004/005698 | 1/2004 |
| WO | WO 2012127454 A2 * | 9/2012 |

OTHER PUBLICATIONS

SP8C-E-200UL94-2-TEE18-1-4, Technical Drawing of Part No. 3451, Pave Technology Co., Accessed online on Aug. 23, 2012 at http://www.pavetechnologyco.com/design/pdf/3451.html, 1 page.

SP8C-E-200UL94-2-TEE18-1-34, Technical Drawing of Part No. 3485, Pave Technology Co., Accessed online on Aug. 23, 2012 at http://www.pavetechnologyco.com/design/pdf/3485.html, 1 page.

PAVE-Seal® Cable Harnesses, SP8C-E-200-2-TEE18-3-4, Technical Drawing of Part No. 3578, Pave Technology Co., Accessed online on Aug. 23, 2012 at http://www.pavetechnologyco.com/design/pdf/3578.html, 1 page.

SP8C-E-200UL94-2-TE18-2-21, Technical Drawing of Part No. 3635, Pave Technology Co., Accessed online on Aug. 23, 2012 at http://www.pavetechnologyco.com/design/pdf/3635.html, 1 page.

PCT International Preliminary Report on Patentability, PCT/US2013/065922, May 14, 2015, 7 pages.

* cited by examiner

DETECTING LEAKS IN A FEEDTHROUGH DEVICE

BACKGROUND

This specification relates to detecting leaks in a feedthrough device, for example, in a fuel injector system. Electro-mechanical fuel injectors are controlled by electrical signals carried by conductors that extend from a low pressure environment into a high pressure zone. The high pressure zone contains a combustible fuel mixture. To prevent the combustible fuel mixture from leaking to the environment, a feedthrough provides a seal around the conductors at the interface where the conductors enter the high pressure zone.

Some conventional feedthroughs include groups of soldered, crimped, or otherwise connected wire strands, with each group of wire strands contained within a solid conductor that is sealed on its outer diameter. A nonconductive body around the conductors seals the conductors relative to each other and ensures insulative spacing between the conductors. When the feedthrough is installed in a fuel injector system, an O-ring seals around the nonconductive body of the feedthrough.

SUMMARY

In one general aspect, a feedthrough device includes an internal leak-detection zone. In some instances, the feedthrough device can be included in a fuel injector system.

In some aspects, a feedthrough device includes first and second opposing outer end faces. The feedthrough device includes an opening, between the first and second opposing outer end faces, that allows fluid communication between an interior and an exterior of the feedthrough device. A conductor extends through the feedthrough device from the first end face, through the interior, to the second end face.

In some aspects, the feedthrough device is adapted for installation between a high pressure zone and a low pressure zone of a fuel injector system. The feedthrough device includes a feedthrough body. The feedthrough body includes a first outer end face and a second outer end face opposite the first outer end face. The feedthrough body includes an outer surface between the first outer end face and the second outer end face. The feedthrough body includes an interior surface defining a cavity. The cavity is disposed between the first outer end face and the second outer end face. The feedthrough body includes a fluid passage through the outer surface that allows fluid communication between the cavity and an exterior of the feedthrough body. The feedthrough device includes a conductor extending through the feedthrough body from the first end face, through the cavity, to the second end face.

Implementations may include one or more of the following features. The feedthrough device includes a first seal between the first outer end face and the fluid passage. The feedthrough device includes a second seal between the second outer end face and the fluid passage. The outer surface includes a cylindrical outer face of the feedthrough body. The first outer end face is a first axial end of the feedthrough body. The second outer end face is a second axial end of the feedthrough body. The first seal and the second seal are both O-rings.

Additionally or alternatively, these and other implementations may include one or more of the following features. The conductor defines a solid conductive cross-section through the cavity. The feedthrough device includes a second conductor extending through the feedthrough body from the first end face, through the cavity, to the second end face. The second conductor defines a second solid conductive cross-section through the cavity. The body is an integral structure made of nonconductive material.

In some aspects, a fuel injector system includes a partition between a high pressure zone and a low pressure zone. The fuel injector system includes a feedthrough device disposed in the partition between the high pressure zone and the low pressure zone. The feedthrough device includes a first end face exposed to the high pressure zone and a second end face exposed to the low pressure zone. The feedthrough device includes a first seal that isolates an interior volume of the feedthrough device from the high pressure zone. The feedthrough device includes a second seal that isolates the interior volume of the feedthrough device from the low pressure zone. The fuel injector system includes a conductor extending through the feedthrough device from the high pressure zone, through the first end face, through the interior volume, through the second end face, to the low pressure zone. The fuel injector system includes a fluid passage that allows fluid communication between the interior volume and an exterior.

Implementations may include one or more of the following features. The fuel injector system includes a sensor. The sensor includes a pressure sensor, a fuel sensor, or both. The low pressure zone includes an internal volume of the fuel injector system. The fuel injector system includes a solenoid assembly in the high pressure zone. The conductor is configured to communicate a control signal between the solenoid assembly in the high pressure zone and an external control system in the low pressure zone. The partition includes a chamber that contains inert gas. The inert gas is contained within the chamber at a pressure that is higher than the pressure of the high pressure zone of the fuel injector system.

In some aspects, an electrical signal is sent from a low pressure zone of a fuel injector system to a high pressure zone of the fuel injector system through a feedthrough device. The feedthrough device has an internal volume that is sealed from the low pressure zone and the high pressure zone. A condition of the internal volume of the feedthrough device is sensed.

Implementations may include one or more of the following features. Sensing the condition includes sensing a pressure of the internal volume. Sensing the condition includes sensing a fuel content of the internal volume. An internal leak in the feedthrough device is identified based on the condition. Sending the electrical signal operates a solenoid assembly in the high pressure zone. The electrical signal is received from a controller in the low pressure zone.

The details of one or more implementations are set forth in the accompanying drawings and the description below. Other features, objects, and advantages will be apparent from the description and drawings, and from the claims.

DESCRIPTION OF DRAWINGS

Like reference symbols in the various drawings indicate like elements.

DETAILED DESCRIPTION

Figure 1:
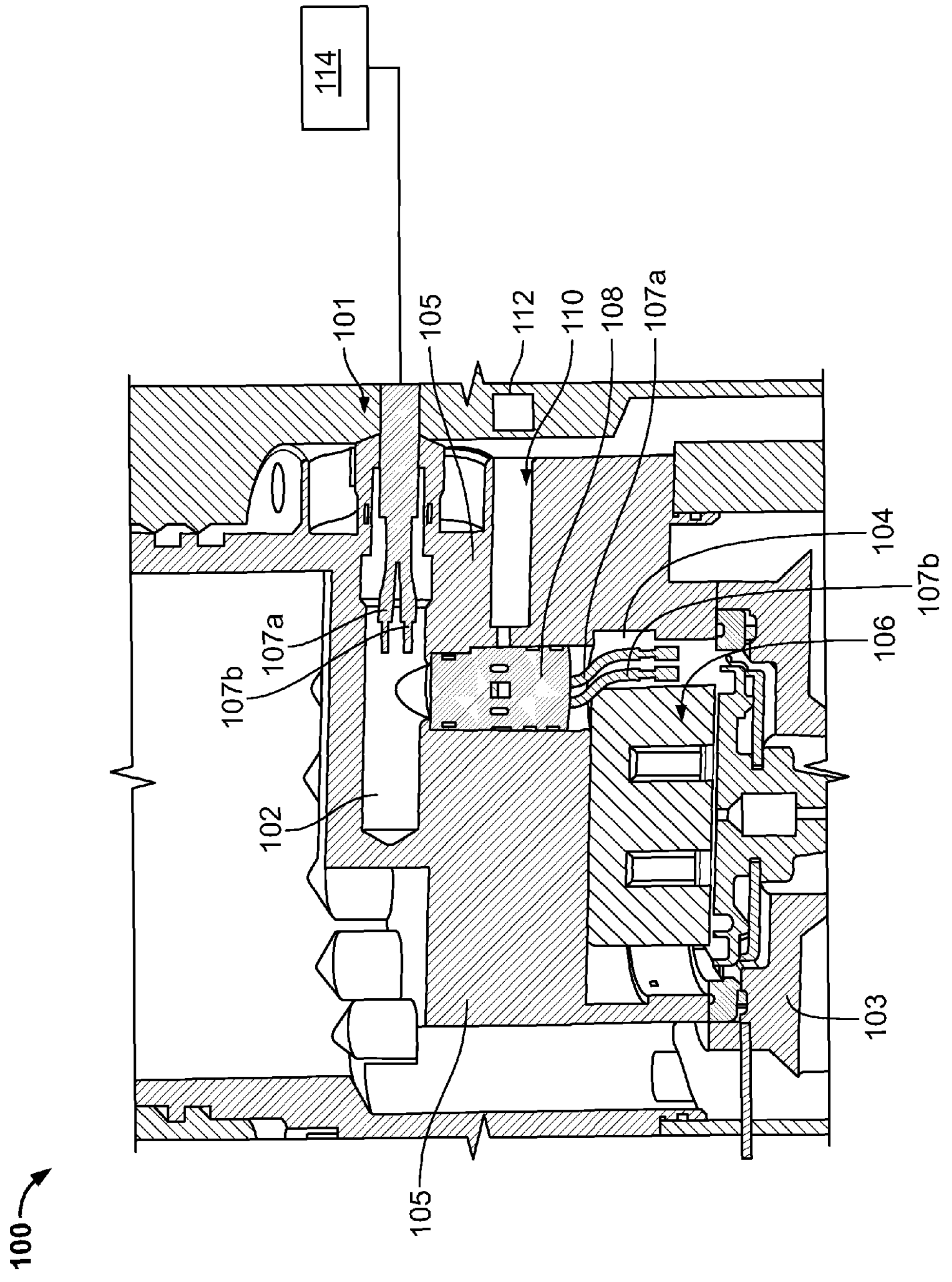
FIG. 1 is a cross-section of an example fuel injector system.

FIG. 1 is a diagram of an example fuel injector system 100. The example fuel injector system 100 shown in FIG. 1 includes low pressure zones 101, 102, high pressure zones 103, 104, and a partition 105 between the low pressure zone 102 and the high pressure zone 104. The example fuel injector system 100 includes a solenoid assembly 106 in the high pressure zone 104. A pair of conductors 107*a*, 107*b* are conductively connected to the solenoid assembly 106 in the high pressure zone 104. The pair of conductors 107*a*, 107*b* extend from the low pressure zone 102 into the high pressure zone 104 through a feedthrough device 108. The feedthrough device 108 includes an internal leak-detection zone in fluid communication with a leak-detection port 110. A sensor 112 is positioned to receive fluid from the leak-detection port 110.

A fuel injector system can include additional or different features; and the features of the example fuel injector system 100 can be arranged in the manner shown in FIG. 1 or in another manner. In some implementations, the example fuel injector system 100 shown in FIG. 1 can be used in engines that must meet regulations set forth by various Marine compliance agencies. A common regulation required by such agencies is the ability to detect or prevent external gas leakage. The example fuel injector system 100 can be included in other types of systems, including systems that meet other types of regulations, or systems that do not meet any specified regulations.

In the example shown in FIG. 1, the low pressure zones 101, 102 are internal to the fuel injector system 100. In some examples, the low pressure zone 101 includes an external environment of the fuel injector system 100. The low pressure zones 101, 102 can be at the same pressure or they can be at different pressures. In some cases, the low pressure zones 101, 102 are sealed from each other, or fluid communication may be permitted between the low pressure zones 101, 102. The low pressure zone 102 can include fluid pressures that are lower (e.g., significantly lower) than the fluid pressure in the high pressure zone 104. For example, the low pressure zone can include fluids at atmospheric pressure. Portions of the conductors 107*a*, 107*b* extend through the low pressure zone 102. Although not shown in FIG. 1, the conductors 107*a*, 107*b* typically connect the controller 114 to the solenoid assembly 106.

The high pressure zones 103, 104 include the solenoid assembly 106, portions of the conductors 107*a*, 107*b*, and possibly other components of the fuel injector system 100. The high pressure zones 103, 104 can be at the same pressure or they can be at different pressures. For example, when solenoid assembly 106 is pressure-balanced, the high pressure zones 103, 104 can be at different pressures, when solenoid assembly 106 is not pressure-balanced, the high pressure zones 103, 104 can be at the same pressure. In some cases, the high pressure zones 103, 104 are sealed from each other, or fluid communication may be permitted between the low pressure zones 103, 104. The high pressure zone 104 can contain a combustible fuel mixture at high pressure during operation of the fuel injector system 100. For example, the high pressure zone 104 can contain fluids at pressures that are significantly higher than the low pressure zone 102. In some implementations, the high pressure zone 104 contains fluids at pressures on the order of 160 psi; or the high pressure zone 104 can contain fluids at different (lower or higher) pressures.

The partition 105 can prevent fluid communication between the low pressure zone 102 and the high pressure zone 104. For example, the partition 105 can be part of a housing or another structure of the fuel injector system 100. The partition 105 can be made of aluminum, steel, plastics, a different material, or a combination of materials. The partition 105 can be made of one or more parts formed by machining, casting, molding, other manufacturing processes. The partition 105 includes a port that houses the feedthrough device 108. The partition 105 also includes the leak-detection port 110 that provides fluid communication between the sensor 112 and the port that houses the feedthrough device 108.

The solenoid assembly 106 is contained in the high pressure zone 104 of the example fuel injector system 100. The solenoid assembly 106 can control a flow of fuel into an internal combustion engine. In some cases, the solenoid assembly 106 can include a plunger or another type of actuator that opens and closes a fuel injection port. In some cases, the actuator of the solenoid assembly 106 moves at an operating frequency of the solenoid (e.g., 5 Hz, 10 Hz, 50 Hz, 100 Hz, etc.). Movement of the actuator can be controlled, for example, by a magnetic field produced by a conductive coil of the solenoid assembly 106. The conductive coil can produce the magnetic field based on an electrical signal (e.g., a direct current signal that is modulated over time, etc.) carried by the conductors 107*a*, 107*b*.

The conductors 107*a*, 107*b* carry an operating signal from the external controller 114 to the solenoid assembly 106. For example, the conductors 107*a*, 107*b* can form a closed-loop circuit with the solenoid assembly 106 and the controller 114. The conductors 107*a*, 107*b* can carry an alternating current, direct current, or another type of signal. The conductors 107*a*, 107*b* can be configured to carry a signal having a voltage in the operating range of the solenoid assembly 106. In some implementations, the conductors 107*a*, 107*b* carry a signal having a maximum voltage between 90 and 140 Volts; or the conductors 107*a*, 107*b* can carry a signal having a lower or higher maximum voltage (e.g., 18 Volts, 180 Volts). Although two conductors are shown in FIG. 1, a different number of conductors (e.g., one, three, four, ten, etc.) may be used.

The conductors 107*a*, 107*b* can be made of copper, brass, gold, a different conducting material, or a combination of them. The conductors can include lengths of braided wire, solid wire, leads, soldered junctions, or a combination of these and other components. In some implementations, the conductors 107*a*, 107*b* are each conductively connected (e.g., soldered) to a first pair of terminals at the controller 114 and a second pair of terminals at the solenoid assembly 106.

The conductors 107*a*, 107*b* extend from the low pressure zone 102, through the feedthrough device 108, into the high pressure zone 104. The feedthrough device 108 provides a pressure-sealed conductive path through the partition 105. The example feedthrough device 108 shown in FIG. 1 resides in a port in the partition 105 between the low pressure zone 102 and the high pressure zone 104. The feedthrough device 108 can be the example feedthrough device 200 shown in FIGS. 2A and 2B or another type of feedthrough device.

The example feedthrough device 108 includes a provision to allow detection of leakage in the feedthrough device 108 itself. For example, an internal cavity in the feedthrough device 108 can function as a leak-detection zone. The leak-detection zone can be exposed to all conductors within the feedthrough device 108, and it can be isolated from both the fuel source and the ambient environment. In some examples, the feedthrough device 108 includes two independent seals, such that fuel leaking through the first seal cannot travel from the first seal to the second seal without passing through the leak-detection zone. Moreover, the leak-detection zone can be connected to a leak detection system, a pressurized leak-prevention system, or another mechanism.

In the event that the feedthrough device 108 develops a leak, high pressure fluids from the high pressure zone 104 can be collected in the leak-detection zone of the feedthrough device 108, and the leak-detection zone of the feedthrough device 108 can communicate the high pressure fluids through the leak-detection port 110 to the sensor 112. As such, a leak in the feedthrough device 108 can be detected, in some cases, by sensing an increased pressure in the leak-detection port 110. In some instances, the fluids leaked from the high pressure zone 104 contain fuel (e.g., hydrocarbon gas). As such, a leak in the feedthrough device 108 can be detected, in some cases, by sensing a fuel concentration or fuel content in the leak-detection port 110.

In some example implementations, the feedthrough device 108 includes an internal cavity and a fluid passage; the fluid passage provides fluid communication between the internal cavity and the leak-detection port 110. In the event that the feedthrough device 108 develops a leak, fluids leaked from the high pressure zone 104 can be communicated through the internal leak-detection zone the feedthrough device 108 and into the leak-detection port 110. For example, the feedthrough device 108 can be configured to accumulate any such leaked fluids in the internal cavity, and the fluid passage of the feedthrough device 108 can communicate the leaked fluids from the internal cavity into the leak-detection port 110. The leak-detection port 110 provides a fluid communication path from the feedthrough device 108 to the sensor 112. In the event that the feedthrough device 108 develops a leak, the leak-detection port 110 can communicate the leaked fluids from the feedthrough device 108 to the sensor 112.

In some example implementations, each of the conductors 107*a*, 107*b* is sealed from the fuel pressure source (i.e., the high pressure zone 104) by a first seal at or near a point where the conductor enters the internal cavity of the feedthrough device 108; and each of the conductors 107*a*, 107*b* is sealed from the low pressure zone 102 by a second seal at or near the point where the conductor exits the internal cavity of the feedthrough device 108. Upon failure of the first seal, leakage through the feedthrough device 108 can be detected via a passage connected to the internal cavity, while the second seal prevents leakage to the external environment. As such, the internal cavity can operate as a leak-detection zone for the feedthrough device 108.

The sensor 112 can be configured to detect a condition that indicates a leak in the feedthrough device 108. In some implementations, the sensor 112 is a pressure sensor. For example, the sensor 112 can be configured to detect static pressure, pressure changes, or other types of pressure conditions. In some implementations, the sensor 112 is a fuel sensor. For example, the sensor 112 can be configured to detect fuel content, fuel concentration, or other types of fluid properties. The sensor 112 may be connected to the controller 114, another type of processor, or an external monitoring system. The example sensor 112 is disposed in a position where it can sense a condition of the internal volume of the feedthrough device 108. The sensor 112 can be installed within the leak-detection port 110, in a low pressure or high pressure zone outside of the leak-detection port 110, or in another area. In some cases, the sensor 112 is omitted from the fuel injector system 100.

The sensor 112 can be part of a monitoring system that includes other components (not shown in the figure). The sensor 112 can be part of a pressure detection system. The pressure detection system can include a fixed volume in which the pressure increase from the accumulation of the leaking fuel can be detected using a pressure sensor. The sensor 112 can be included in a fuel detection system (e.g., a methane detector, etc.).

In some examples, the sensor 112 is a dedicated sensor for the leak-detection port 110. As such, the conditions detected by the sensor 112 may directly indicate whether a leak has formed in the feedthrough device 108. In some examples, the sensor 112 receives fluid from the leak-detection port 110 and other leak-detection ports at other locations in the fuel injector system 100. As such, the conditions detected by the sensor 112 may indicate whether a leak has formed at any of several locations in the fuel injector system 100. In some implementations, the fuel injector system 100 is contained in an external housing or another type of external enclosure (not shown in the figure), and the sensor 112 is configured to detect any leakage within the enclosure.

In some implementations, the leak-detection port 110 is filled with high pressure inert gas (e.g., air, nitrogen, etc.). The high pressure inert gas in the leak-detection port 110 can prevent or reduce leaking of fuel through the feedthrough device 108 to an external environment. The high pressure inert gas in the leak-detection port 110 can be maintained at a pressure that is higher than the pressure within the high pressure zone 104. If a leak occurs in the feedthrough device 108, the pressure of the inert gas in the leak-detection port 110 can, in some cases, minimize or reduce the amount of fuel that escapes from the high pressure zone 104 through the leak. As such, a leak in the feedthrough device 108 can be rendered inert through the introduction of the high pressure inert fluid. In some cases, the inert gas in the leak-detection port 110 can flood the internal volume of the feedthrough device 108.

In some aspects of operation, the controller 114 sends an electrical signal from the low pressure zone 102 to the high pressure zone 104 through the feedthrough device 108. The electrical signal from the controller 114 (in the low pressure zone 102) operates the solenoid assembly 106 (in the high pressure zone 104). The feedthrough device 108 has an internal cavity that is sealed from the low pressure zone 102 and the high pressure zone 104. The internal cavity can communicate fluid into the leak-detection port 110, so that the sensor 112 can sense a condition of the internal volume of the feedthrough device 108.

In some aspects of operation, the sensor 112 can produce an output that indicates (e.g., directly or indirectly) whether there is a leak in the feedthrough device 108. For example, if the feedthrough device 108 develops a leak, the combustible, high pressure fuel from the high pressure zone 104 is collected in the internal cavity of the feedthrough device 108 and communicated to the sensor 112. In some instances, the sensor 112 senses the pressure, fuel content, or another condition of the internal cavity of the feedthrough device 108. The conditions sensed by the sensor can be communicated to the controller 114 or another external system, which can produce a signal or another appropriate output to indicate whether a leak has been detected. If a leak is detected, an appropriate action can be initiated, such as, for example, powering down all or part of the system. In some examples, potential external leak paths of the fuel valve can be pressurized to a pressure that is equal to, or higher than, the inlet pressure of the fuel valve. In such cases, a fuel valve "leak" would simply result in flow of the leak system pressurized media into the fuel valve.

Figure 2A:
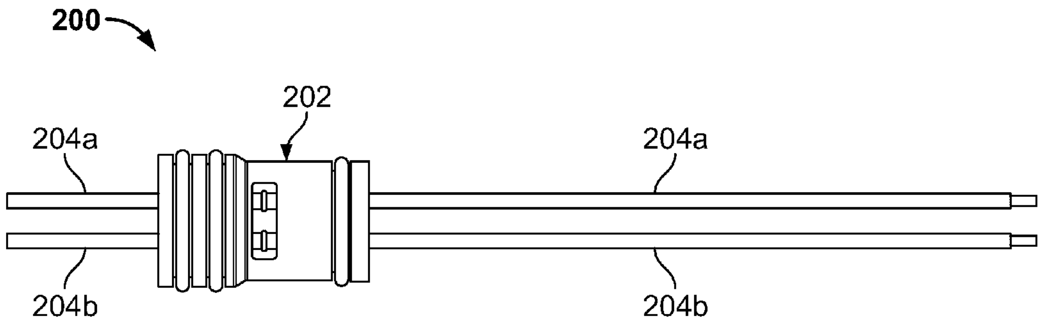
FIGS. 2A and 2B are diagrams of an example feedthrough device.
Figure 2B:
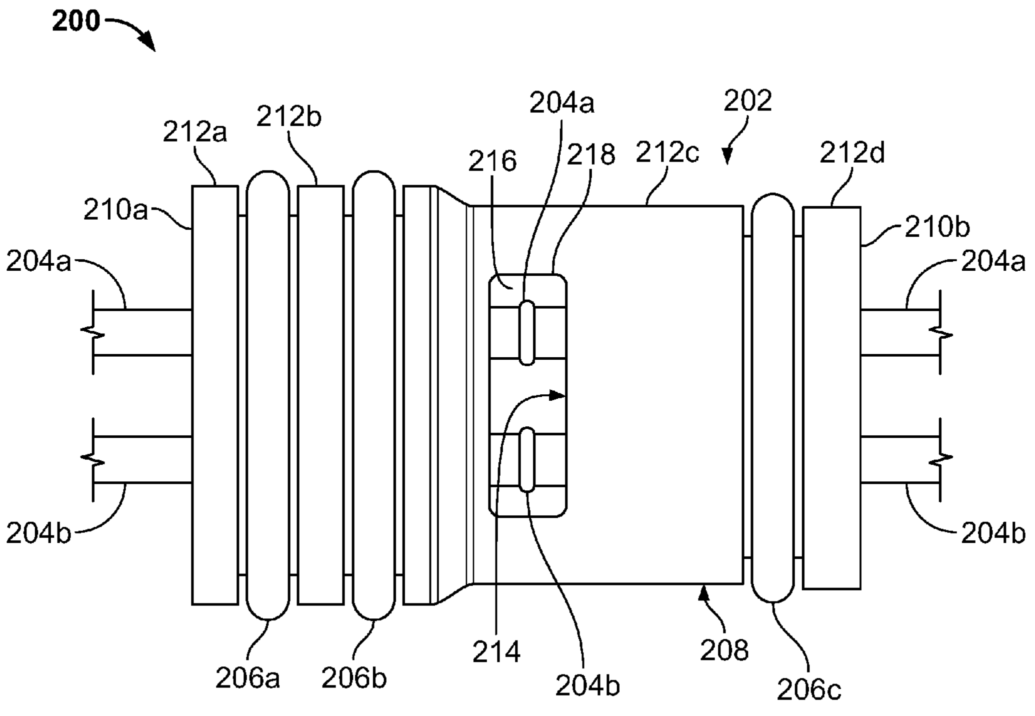

FIGS. 2A and 2B are diagrams of an example feedthrough device 200. The example feedthrough device 200 can be used as the feedthrough device 108 of the fuel injector system 100 shown in FIG. 1. The feedthrough device 200 can be used in other contexts and in other types of applications. For example, the feedthrough device 200 and variations thereof can be used in other locations in a fuel injector system, in other components of an engine system, or in applications other than engine systems.

The feedthrough device 200 can be used or adapted to provide a pressure-sealed conductive pathway between any two zones of different pressures. The pressure difference between the two zones can range from small pressure differences (e.g., 10 psi) in some applications to larger pressure differences (e.g., 10,000 psi) in other applications. As such, in some instances, the dimensions, materials, and features of the example feedthrough device 200 can be adapted for particular applications other than a fuel injector system.

As shown in FIG. 2A, the example feedthrough device 200 includes a feedthrough body 202 and two conductors 204*a*, 204*b*. Features of the feedthrough body 202 are shown in FIG. 2B. The feedthrough device 200 can enable leak prevention or leak detection by utilizing a feedthrough body 202 that includes a nonconductive housing with an internal cavity 216, which can function as a leak-detection zone. The feedthrough device 200 can be configured such that all conductors pass through the internal cavity 216. For example, both of the conductors 204*a*, 204*b* pass through the internal cavity 216 shown in FIG. 2B. The feedthrough body 202 also includes a structural connection (other than the conductors 204*a*, 204*b*) between the high pressure side and the low pressure side of the feedthrough body 202 housing. This structural connection can increase the overall strength of the feedthrough device 200, improving its robustness in environmentally challenging environments, such as, for example, those with high vibration levels, high structural loading, etc.

The example feedthrough body 202 includes a first outer end face 210*a* at a high pressure end of the feedthrough body 202. The feedthrough body 202 includes a second outer end face 210*b* at a low pressure end of the feedthrough body 202. The first outer end face 210*a* and the second outer end face 210*b* are at opposite ends of the feedthrough body 202. The feedthrough body 202 includes an outer surface 208 between the first outer end face 210*a* and the second outer end face 210*b*.

The example feedthrough body 202 has a generally cylindrical geometry, with the first outer end face 210*a* defining a first axial end of the feedthrough body 202 and the second outer end face 210*b* defining a second axial end of the feedthrough body 202. The outer surface 208 generally defines an outer circumference of the feedthrough body 202. In particular, the outer surface 208 includes cylindrical faces 212*a*, 212*b*, 212*c*, 212*d*, and seals 206*a*, 206*b*, 206*c* between the cylindrical faces. In the example shown, the seals 206*a*, 206*b*, 206*c* are all O-rings. Other types of seals can be used.

The example feedthrough body 202 is a continuous structure between the first and second outer end faces 210*a*, 210*b*. In some implementations, a feedthrough body includes multiple components. For example, a feedthrough body can be made of two components separated by a gap, where one of the components carries one or more seals (e.g., 206*a*, 206*b*) on the high-pressure side and a separate component carries one or more seals (e.g., 206*c*) on the low-pressure side. The two separate components can abut each other, or they can be separated by open space.

The feedthrough body 202 can include additional or different types of seals, including seals in other locations. In some implementations, the feedthrough body 202 includes an internal seal on each side of the feedthrough body. For example, the feedthrough body 202 can include seals about the conductors 204*a*, 204*b* at the first and second outer end faces 210*a*, 210*b*, at the interior surface 214, between an outer end face and the interior surface 214, or in multiple locations within the feedthrough body. The seals about the conductors 204*a*, 204*b* can prevent high pressure gas from leaking between the feedthrough body 202 and the conductors 204*a*, 204*b*. The seals can include, for example, O-rings, adherent compounds, compressive joints, etc.

When the feedthrough device 200 is installed (e.g., in a fuel injector system) between a high pressure zone and a low pressure zone, the feedthrough body 202 can prevent fluid communication between the low pressure zone and the high pressure zone. For example, the feedthrough body 202 can be installed in a port through a housing or another structure, and the seals 206*a*, 206*b*, 206*c* can form a pressure seal in the port. The feedthrough body 202 can be made of epoxy, a different kind of nonconductive material, or a combination of materials. In some cases, the feedthrough body 202 is an integral structure made of nonconductive material. The feedthrough body 202 can be formed by molding, machining, casting, or other manufacturing processes.

The example feedthrough body 202 includes an interior surface 214 defining the internal cavity 216. The internal cavity 216 is disposed between the first outer end face 210*a* and the second outer end face 210*b*. The internal cavity 216 is enclosed on multiple sides. For example, the internal cavity 216 is enclosed by the interior surface 214 that includes an internal face on the high pressure side of the feedthrough body 202 and an opposing internal face on the low pressure side of the feedthrough body 202. The interior surface 214 also includes a cylindrical internal face between the opposing low pressure and high pressure sides. The internal cavity 216 is not fully enclosed. In particular, the feedthrough body 202 includes a fluid passage 218 through the outer surface 208, which allows fluid communication between the internal cavity 216 and an exterior of the feedthrough body 202.

Both conductors 204*a*, 204*b* extend through the example feedthrough body 202 from the first outer end face 210*a*, through the internal cavity 216, to the second outer end face 210*b*. The example conductors 204*a*, 204*b* shown in FIG. 2B include a solid brass section that extends through the internal cavity 216. Outside of the internal cavity 216, the conductors 204*a*, 204*b* can include braided wires, soldered junctions, and other features. In some examples, each conductor includes braided wire outside the feedthrough body 202, and each braided wire is connected to one of the solid brass sections that extend through the internal cavity 216. For example, the braided wire can be soldered to leads or other connectors within the feedthrough body 202, outside the feedthrough body 202, or both. Because both example conductors are solid brass through the internal cavity 216, both conductors define a solid conductive cross-section through the internal cavity 216. In other words, between the opposing faces of the interior surface 214, the conductor 204*a* has a solid conductive cross-section and the conductor 204*b* has a separate solid conductive cross-section. As such, neither conductor 204*a*, 204*b* has internal voids that would permit fluid leakage within the conductor across the internal cavity 216.

The example feedthrough body 202 includes seals to prevent fluid leaks. The seal 206*a* provides a first seal on the high pressure side of the feedthrough body 202. The seal 206*b* provides a second seal on the high pressure side of the feedthrough body 202. The seals 206*a*, 206*b* seal between the first outer end face 210*a* and the internal cavity 216. The seal 206*c* provides a third seal on the low pressure side of the feedthrough body 202. The seal 206*c* seals between the second outer end face 210*b* and the internal cavity 216.

The second and third seals (206*b*, 206*c*) define an internal volume of the example feedthrough body 202 between the first outer end face 210*a* and the second outer end face 210*b*. The internal volume includes the internal cavity 216 and the fluid passage 218 through the outer surface 208. When the example feedthrough device 200 is installed (e.g., in a fuel injector system), the internal volume can be placed in fluid communication with an external fluid passage (e.g., the leak-detection port 110 in FIG. 1). As in the example shown in FIG. 1, the external fluid passage can contain or lead to a sensor 112 configured to detect leaks in the feedthrough device.

The internal volume of the example feedthrough device 200 can provide an internal leak-detection zone. In some instances, the structure of the feedthrough device 200 causes any fluid leaked from the high pressure side to flow into the internal volume (e.g., into the internal cavity 216). For example, the solid current-carrying interconnects within the internal cavity 216 in the example shown in FIG. 2B will not allow fuel to travel along the conductor surface without entering into the leak-detection zone. Similarly, leaks in the feedthrough body or seals will flow into the leak-detection zone. From the leak-detection zone, the leaked fluids can be detected, for example, by a sensor.

While this specification contains many details, these should not be construed as limitations on the scope of what may be claimed, but rather as descriptions of features specific to particular examples. Certain features that are described in this specification in the context of separate implementations can also be combined. Conversely, various features that are described in the context of a single implementation can also be implemented separately or in any suitable subcombination.

A number of examples have been shown and described. Nevertheless, it will be understood that various modifications can be made. Accordingly, other embodiments are within the scope of the following claims.

The invention claimed is:

1. A fuel injector system comprising:

a partition between a high pressure zone, a low pressure zone, and a leak detection port of the fuel injector system; and a feedthrough device disposed in the partition between the high pressure zone, the low pressure zone, and the leak detection port, the feedthrough device comprising a continuous feedthrough body and one or more conductors extending through the feedthrough body, the continuous feedthrough body having a first outer end face at the high pressure zone, a second outer end face opposite the first end at the low pressure zone, an outer surface extending between the first outer end face and the second outer end face, and an internal cavity defined therewithin, the conductors passing between and exposed to both the high pressure zone and the low pressure zone within the internal cavity, and one or more fluid passages through the outer surface of the continuous feedthrough body allowing fluid communication between the internal cavity and the leak detection port.

2. The fuel injector system of claim 1, comprising a sensor in communication with the internal cavity.

3. The fuel injector system of claim 2, the sensor comprising a fluid-detection sensor for detecting fuel in the cavity.

4. The fuel injector system of claim 2, the sensor comprising a pressure sensor for detecting pressure within the cavity.

5. The fuel injector system of claim 1, the continuous feedthrough body comprising a cylindrical shape, wherein the first outer end face and the second outer end face are cylindrical faces, the outer surface is a cylindrical face, and the continuous feedthrough body further comprises seals between the cylindrical faces.

6. The fuel injector system of claim 1, wherein the one or more fluid passages open to the cylindrical face of the continuous feedthrough body.

7. The fuel injector system of claim 6, wherein at least one seal is arranged on a first axial side of the cylindrical face, and at least one further seal is arranged on a second, opposite axial side of the cylindrical face.

8. The fuel injector system of claim 7, wherein the seals comprise O-rings.

9. The fuel injector system of claim 1, wherein the continuous feedthrough body is made of a non-conductive material.

10. The fuel injector system of claim 1, wherein the feedthrough device is arranged within a passage having a shape that corresponds to the shape of the feedthrough device, and the feedthrough device seals between ends of the passage while allowing the one or more conductors to provide electrical conductivity through the first end face, the internal cavity and the second end face of feedthrough device.

11. The fuel injector system of claim 10, wherein the continuous feedthrough body comprises a first end portion proximal the first outer end face, and a second end portion proximal the second outer end face opposite the first end portion, wherein the second end portion is adapted to be accommodated within the passage, and the first end portion is larger than the second end portion and is adapted to be larger than at least a transverse portion of the passage.

12. The fuel injector system of claim 1, further comprising a solenoid assembly in the high pressure zone, wherein the conductor is configured to communicate a control signal to the solenoid assembly in the high pressure zone from a control system in an external environment.

13. The fuel injector system of claim 1, wherein the continuous feedthrough body is formed as a continuous structure between the first outer end face in fluid communication with the high pressure zone and the second outer end face opposite the first outer end face and in fluid communication with the low pressure zone, wherein the internal cavity is defined by an interior surface within the continuous feedthrough body between the first outer end face and the second outer end face.

14. A feedthrough device comprising:

a continuous feedthrough body having a first outer end face at a high pressure zone of a fuel injector system, a second outer end face opposite the first end at the low pressure zone of the fuel injector system, an outer surface extending between the first outer end face and the second outer end face, and defining an internal cavity, one or more fluid passages through the outer surface of the continuous feedthrough body allowing fluid communication between the internal cavity and the outer surface of the continuous feedthrough body; and one or more conductors extending through the continuous feedthrough body between and exposed to both the high pressure zone and the low pressure zone, the conductors passing within the internal cavity.

15. The feedthrough device of claim 14, wherein the continuous feedthrough body comprises a cylindrical shape, wherein the first outer end face and the second outer end face are cylindrical faces, the outer surface is a cylindrical face, and the continuous feedthrough body further comprises seals between the cylindrical faces.

16. The feedthrough device of claim 14, wherein the one or more fluid passages open to the cylindrical face of the continuous feedthrough body.

17. The feedthrough device of claim 16, comprising at least one seal arranged on a first axial side of the cylindrical face of the housing at least one further seal arranged on a second, opposite axial side of the cylindrical face of the continuous feedthrough body.

18. The feedthrough device claim 17, wherein the seals comprise O-rings.

19. The feedthrough device of claim 14, wherein the continuous feedthrough body is made of a non-conductive material.

20. The feedthrough device of claim 14, wherein the feedthrough device being adapted to seal between ends of a passage in the fuel injector system while allowing the one or more conductors to provide electrical conductivity across the feedthrough device.

21. The feedthrough device of claim 20, wherein the continuous structure comprises a first end portion proximal the first outer end face, and a second end portion proximal the second outer end face opposite the first end portion, wherein the second end portion is adapted to be accommodated within the passage, and the first end portion is larger than the second end portion and is adapted to be larger than at least a transverse portion of the passage.

22. The feedthrough device of claim 14, wherein the continuous feedthrough body is formed as a continuous structure between the first outer end face in fluid communication with the high pressure zone and the second outer end face opposite the first outer end face and in fluid communication with the low pressure zone, wherein the internal cavity is defined by an interior surface within the continuous feedthrough body between the first outer end face and the second outer end face.

* * * * *